United States Patent
Lee et al.

(10) Patent No.: US 10,156,888 B2
(45) Date of Patent: Dec. 18, 2018

(54) METHOD AND APPARATUS FOR CONTROLLING MULTIPLE PROCESSORS TO REDUCE CURRENT CONSUMPTION

(71) Applicant: Samsung Electronics Co., Ltd., Gyeonggi-do (KR)

(72) Inventors: Hyoungjoo Lee, Gyeonggi-do (KR); Taeyoon Kim, Gyeonggi-do (KR); Mingyu Kang, Seoul (KR); Youngpo Lee, Seoul (KR); Chaiman Lim, Seoul (KR); Dukhyun Chang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 115 days.

(21) Appl. No.: 14/964,176

(22) Filed: Dec. 9, 2015

(65) Prior Publication Data

US 2016/0162016 A1 Jun. 9, 2016

(30) Foreign Application Priority Data

Dec. 9, 2014 (KR) .................. 10-2014-0176159
Sep. 25, 2015 (KR) .................. 10-2015-0136190

(51) Int. Cl.
*G06F 1/32* (2006.01)

(52) U.S. Cl.
CPC .......... *G06F 1/3287* (2013.01); *G06F 1/3293* (2013.01); *G06F 1/3296* (2013.01); *Y02D 10/122* (2018.01); *Y02D 10/171* (2018.01); *Y02D 10/172* (2018.01); *Y02D 70/20* (2018.01)

(58) Field of Classification Search
CPC ..... G06F 1/3287; G06F 1/3293; G06F 1/3296
See application file for complete search history.

(56) References Cited

U.S. PATENT DOCUMENTS

| | | | | |
|---|---|---|---|---|
| 4,764,865 A | * | 8/1988 | Temple, III | ......... G06F 13/1663 711/150 |
| 6,901,276 B1 | * | 5/2005 | Skinner | ................. H04W 48/16 455/574 |
| 7,962,775 B1 | * | 6/2011 | Vaidyu | .................. G06F 1/3203 713/323 |
| 8,223,685 B2 | | 7/2012 | Baglin et al. | |
| 8,755,848 B2 | | 6/2014 | Jain et al. | |
| 8,811,284 B2 | | 8/2014 | Chung et al. | |

(Continued)

OTHER PUBLICATIONS

International Search Report dated Mar. 16, 2016 issued in counterpart application No. PCT/KR2015/013325, 13 pages.

*Primary Examiner* — Mark A Connolly
*Assistant Examiner* — Mohammad A Rahman
(74) *Attorney, Agent, or Firm* — The Farrell Law Firm, P.C.

(57) ABSTRACT

A method and apparatus are provided for controlling multiple processors in order to reduce current consumption in electronic device. An electronic device includes an application processor (AP) configured to control a plurality of functions; a communication processor (CP) electronically connected to the AP; and a sensor module or a communication module electronically connected to the CP. When the AP enters a sleep state, the CP is configured to control at least one function among the plurality of functions based on information collected from the sensor module or the communication module according to a discontinuous reception (DRX) operating period.

17 Claims, 8 Drawing Sheets

(56) References Cited

U.S. PATENT DOCUMENTS

| | | | |
|---|---|---|---|
| 9,012,846 B2* | 4/2015 | Almalki | G01N 21/55 |
| | | | 250/338.1 |
| 9,155,044 B2 | 10/2015 | Chung et al. | |
| 9,436,970 B2* | 9/2016 | Connell | G06T 1/20 |
| 2007/0077960 A1 | 4/2007 | Jain et al. | |
| 2009/0268654 A1 | 10/2009 | Baglin et al. | |
| 2010/0137035 A1* | 6/2010 | Shan | G06F 1/3293 |
| | | | 455/566 |
| 2011/0039536 A1* | 2/2011 | Lee | H04W 52/0216 |
| | | | 455/422.1 |
| 2012/0002635 A1 | 1/2012 | Chung et al. | |
| 2013/0210428 A1* | 8/2013 | Manna | H04W 52/0209 |
| | | | 455/434 |
| 2014/0025975 A1* | 1/2014 | Namgoong | G06F 1/3206 |
| | | | 713/323 |
| 2014/0037109 A1 | 2/2014 | Ban | |
| 2014/0090047 A1* | 3/2014 | Yuan | H04L 63/0263 |
| | | | 726/13 |
| 2014/0119256 A1* | 5/2014 | Kim | H04W 52/0209 |
| | | | 370/311 |
| 2014/0204772 A1 | 7/2014 | Zhang et al. | |
| 2014/0278443 A1* | 9/2014 | Gunn | G06F 3/0488 |
| | | | 704/275 |
| 2014/0321302 A1* | 10/2014 | Fan | H04W 52/0277 |
| | | | 370/252 |
| 2014/0321346 A1 | 10/2014 | Chung et al. | |
| 2015/0117286 A1* | 4/2015 | Kim | H04W 52/0216 |
| | | | 370/311 |
| 2015/0227191 A1* | 8/2015 | Pitigoi-Aron | A61B 5/0024 |
| | | | 713/189 |
| 2015/0327171 A1 | 11/2015 | Chung et al. | |
| 2016/0220153 A1* | 8/2016 | Annegarn | A61B 5/1117 |
| 2017/0048729 A1* | 2/2017 | Jin | H04W 24/02 |

\* cited by examiner

METHOD AND APPARATUS FOR CONTROLLING MULTIPLE PROCESSORS TO REDUCE CURRENT CONSUMPTION

PRIORITY

This application priority under 35 U.S.C. § 119(a) to Korean Patent Application Serial Nos. 10-2014-0176159 and 10-2015-0136190, which were filed in the Korean Intellectual Property Office on Dec. 9, 2014 and Sep. 25, 2015, respectively, the entire disclosure of each of which is incorporated herein by reference.

BACKGROUND

1. Field of the Disclosure

The present disclosure relates generally to a technique for reducing current consumption in an electronic device, and more particularly, to a method and apparatus for controlling multiple processors in order to reduce current consumption.

2. Description of Related Art

Electronic devices such as smartphones and tablets often include an application processor (AP) for supporting functions relating thereto and a communication processor (CP) (or a modem processor) for supporting communication related functions.

In general, the AP controls functions in relation to WiFi, GPS, Bluetooth, a display, etc., and therefore, is required to maintain an active state in which a relatively large amount of current is consumed. The CP usually consumes less current than the AP.

If an electronic device is not in use for a long period of time, the AP may enter an inactive or sleep state. For example, after a period of non-use, in order to lower current consumption, the electronic device may turn off a display and enter a sleep state, which includes deactivating operations of various sensors.

However, in an electronic device supporting cellular communication such as $3^{rd}$ Generation/$2^{nd}$ Generation (3G/2G) or Long Term Evolution (LTE), in order to perform a discontinuous reception (DRX) operation, even if the AP enters an inactive state, the CP still periodically wakes up to obtain paging information.

In order to improve power consumption, the electronic device may include settings that allow the AP to enter a sleep state. For example, if user input, application notification, or data communication does not occur in the electronic device for 30 min, the electronic device may enter a low power mode, changing the AP into a sleep state.

When receiving a new message (e.g., a short message service (SMS) message) in the low power mode, the electronic device may turn on a display by re-activating an AP and display a notification of the message through the display. If a user cannot check the notification, e.g., because the user is asleep or the electronic device is in a bag, the electronic device maintains the display in an ON state for a predetermined time and an AP to be in an active state, e.g., for another 30 minutes. Accordingly, such an operation unnecessarily causes significant power consumption, as it does not actually provide any information to a user.

SUMMARY

The present disclosure is made to address at least the above-mentioned problems and/or disadvantages and to provide at least the advantages described below.

Accordingly, an aspect of the present disclosure is to provide a method of minimizing unnecessary power consumption by controlling various functions or modules of an electronic device during a sleep state of an AP by utilizing a CP, which consumes less power, but has similar processing power, as the AP.

In accordance with an aspect of the present disclosure, an electronic device is provided, which includes an application processor (AP) configured to control a plurality of functions; a communication processor (CP) electronically connected to the AP; and a sensor module or a communication module electronically connected to the CP. When the AP enters a sleep state, the CP is configured to control at least one function among the plurality of functions based on information collected from the sensor module or the communication module according to a discontinuous reception (DRX) operating period.

In accordance with another aspect of the present disclosure, an electronic device is provided, which includes an application processor (AP); and a communication processor (CP) connected to the AP and configured to search for an available radio resource according to a discontinuous reception (DRX) operating period, and to skip for the available radio resource in at least one DRX operating period when a specified condition is satisfied.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
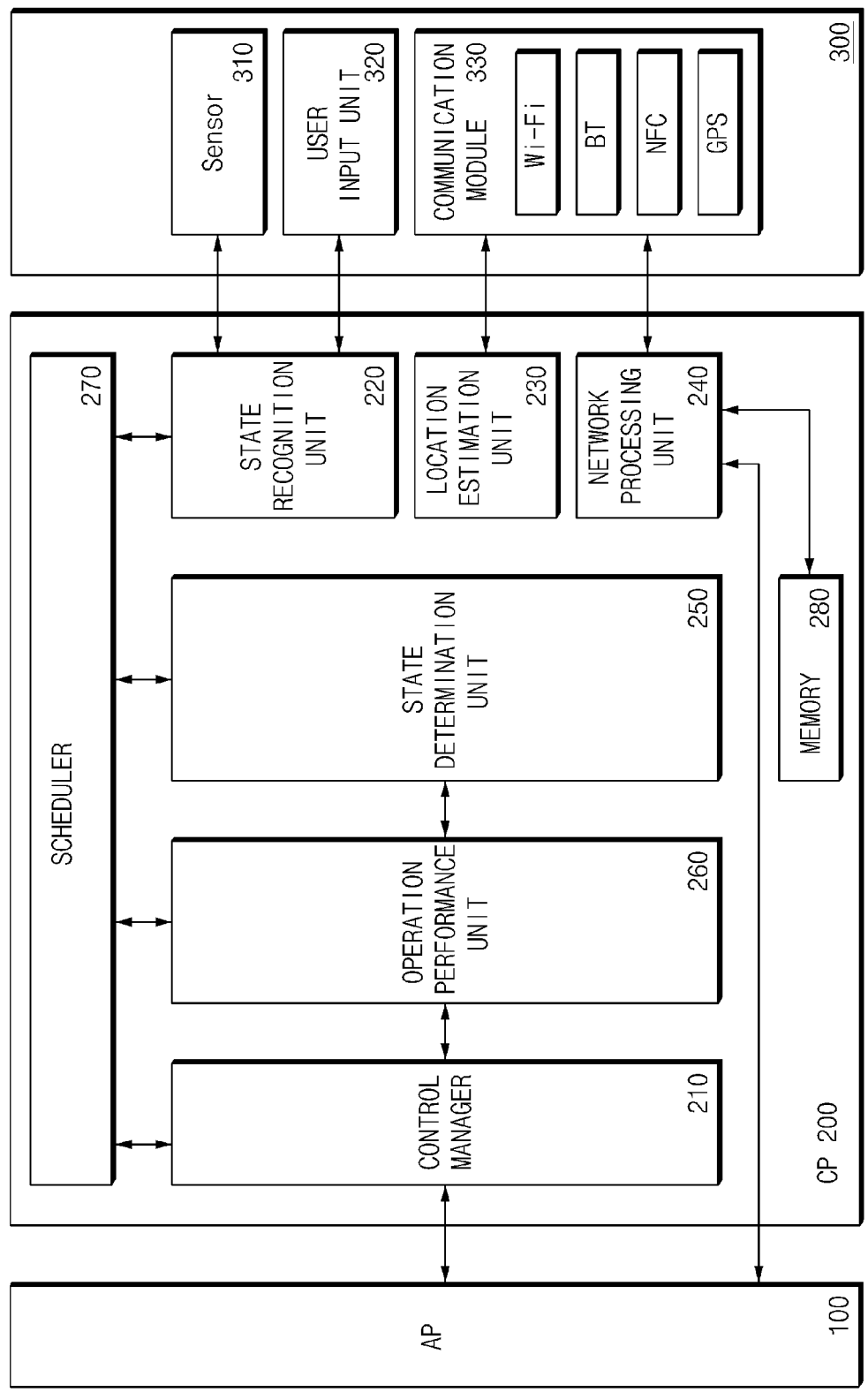
FIG. 1 illustrates an electronic device according to an embodiment of the present disclosure.

Hereinafter, various embodiments of the present disclosure are described with reference to the accompanying drawings. However, these descriptions do not limit the present disclosure to the specifically described embodiments and the present disclosure covers all the modifications, equivalents, and/or alternatives of this disclosure provided they come within the scope of the appended claims and their equivalents.

With respect to the descriptions of the drawings, like reference numerals refer to like elements.

Notably, the terms used to describe specific embodiments of the present disclosure are not intended to limit the scope of other embodiments. The terms of a singular form may include plural forms unless they have a clearly different meaning in the context.

Additionally, unless otherwise indicated herein, all the terms, which include technical or scientific terms, may have the same meanings that as generally understood by a person skilled in the art. In general, terms defined in a dictionary should be considered to have the same meanings as is customary in the related art, and should not be understood abnormally or as having an excessively formal meaning.

Regardless, even the terms defined in this specification cannot be interpreted as excluding embodiments of the present disclosure.

The terms "include", "comprise", "have", "may include", "may comprise", and "may have" indicate disclosed functions, operations, or existence of elements, but do not exclude other functions, operations, or elements.

For example, the expression "A or B" or "at least one of A or/and B" may indicate include A, B, both A and B, at least one A, at least one B, or both at least one A and at least one B.

Herein, terms such as "1st", "2nd", "first", "second", etc., may modify different elements of various embodiments of the present disclosure, but do not limit the elements. For example, "a first user device" and "a second user device" may indicate different user devices regardless of the order or the importance. A first component may be referred to as a second component and vice versa, without departing from the scope of the present disclosure.

When a component (e.g., a first component) is referred to as being "(operatively or communicatively) coupled with/to" or "connected to" another component (e.g., a second component), the first component may be directly connected to the second component or connected through another component (e.g., a third component). However, when the first component is referred to as being "directly connected to" or "directly accessed by" the second component, another component does not exist therebetween.

Herein, the expression "configured to" may be interchangeably used with "suitable for", "having the capacity to", "designed to", "adapted to", "made to", or "capable of" according to context.

Further, the expression "configured to" may not necessarily mean "specifically designed to" in terms of hardware. Instead, the expression "a device configured to" in some situations may mean that the device and another device or part are "capable of". For example, "a processor configured to perform A, B, and C" may mean a dedicated processor (e.g., an embedded processor) for performing a corresponding operation or a generic-purpose processor (e.g., a central processing unit (CPU) or AP) for performing corresponding operations by executing at least one software program stored in a memory device.

Herein, the term "user" may refer to a person using an electronic device or a device (e.g., an artificial intelligence device) using the electronic device.

FIG. 1 illustrates an electronic device according to an embodiment of the present disclosure.

Referring to FIG. 1, the electronic device includes an AP 100, a CP 200, and components 300, which correspond to various functions. Although illustrated as separate components in FIG. 1, the AP 100 and the CP 200 may be included in an integrated chip, such as a system on chip (SoC). For example, the SoC may include a CPU, a graphics processing unit (GPU), and a CP, wherein the CPU and the GPU correspond to the AP 100. The AP 100 may be responsible for a control of overall functions of the electronic device and the CP 200 may be responsible for communication functions of the electronic device.

The various components 300 include a sensor module 310, a user input unit 320, and a communication module 330. However, the various components 300 are not limited to the exemplarily components thereof illustrate in FIG. 1, and some components thereof may be omitted and/or additional components may added thereto, e.g., a display, a microphone, and/or a speaker.

For example, the sensor module 310 may include an illumination sensor, a proximity sensor, an acceleration sensor, and/or a gyro sensor. The user input unit 320 may include at least one of a touch screen panel, a physical keyboard, a physical button, an electronic pen (e.g., a stylus), a panel for detecting an input thereof, and a voice recognition module (e.g., a microphone) for voice input of the electronic device.

The communication module 330 may include a cellular module for supporting cellular communication such as 3G or LTE. Alternatively, the communication module 330 may include a module for supporting WiFi, Bluetooth (BT), near field communication (NFC), and/or global positioning system (GPS). The communication module 330 may also include a module for wired connection (e.g., local area network (LAN) or universal serial bus (USB) communication), and a module for WiFi Direct or Bluetooth Low Energy (BLE).

Some components for performing communication in the electronic device may be included in the CP 200. For example, a signal processing module (e.g., a radio frequency integrated circuit (RFIC)) for cellular communication and GPS may be included in the CP 200. Although an antenna and a front-end module (FEM) for each communication are disposed outside the CP 200, some of signal processing modules may be included inside the CP 200.

From an existing smartphone's software architecture perspective, an operating system (OS) such as Android®, iOS®, Linux®, or Windows® is operated by an AP (e.g., the AP 100) and the AP is directly connected to a CP, a WiFi module, a GPS module, a Bluetooth module, a display (for example, liquid crystal display (LCD), light emitting diode (LED), etc.), and various sensors in order to control functions of these components and perform a calculation process for data processing. Accordingly, the AP may be required to maintain an activation state, which may consume excess current. However, according to an embodiment of the present disclosure, when the AP 100 enters a sleep state, the CP 200 may obtain a control right for at least some of the functions controlled by the AP 100, thereby minimizing power consumption by performing these functions without waking-up the AP 100.

Herein, when a target of control is a specific entity or component, a control right and a block control right may have the same meaning. For example, a GPS control right and a GPS block control right may have the same meaning.

As another example, when a target of control for a specific operation is a bundle (or group) of several objects/components, the block control right may mean a control right for the specific operation. For example, when the CP 200 collects information for determining a state of the electronic device or whether a user uses the electronic device, specific sensors or several objects/components (e.g., GPS and WiFi modules) for obtaining location information may be expressed in a corresponding block. The expression "control right" described in this specification may be appropriately replaced with "block control right" according to the embodiment or context.

Referring again to FIG. 1, the AP 100 may be functionally connected to the CP 200. For example, the AP 200 may assign a control right for specific function to the CP 200 through a control manager 210 of the CP 200. For example, the CP 200 may acquire a control right for the sensor module 310, the user input unit 320, and the communication module 330, which are functionally connected to the CP 200, by transfer.

When the AP 100 is in an active state, e.g., when a user uses the electronic device for Internet surfing, video watching, game playing, etc., the AP 100 may be responsible for a control such as ON/OFF or an operating period of corresponding blocks.

Although the AP 100 is functionally connected to the CP 200 and a relationship with other components 300 is not illustrated in FIG. 1, it is apparent to those skilled in the art that the AP 100 in an active state will directly control the components 300.

However, when a user does not use the electronic device, or under a specific condition (e.g., during playback of a music file stored in the electronic device) for which the electronic device is capable of entering a low power mode, the AP 100 may provide, to the CP 200, a message indicating that a control right for a corresponding block is transferred. The AP 100 may deliver, to the CP 200 (e.g., the control manager 210 thereof), information indicating that the AP 100 is entering an inactive state or information on the specific condition. Accordingly, a conflict issue of a control right between the processors, which may occur in relation to transferring a control right between the AP 100 and the CP 200, may be resolved.

As described above, when the AP 100 enters a specific state, e.g., a sleep state and an audio playback state (e.g., a state of playing only an MP3 file when a display is turned off and a user input is not provided), or when the AP 100 enters a low power state defined by a user or a manufacturer, the AP 100 may deliver a control message for transferring a control right to the CP 200. Alternatively, a control right may be transferable in response to a request from the CP 200. For example, if a specified condition is satisfied, the CP 200 may deliver, to the AP 100, a message requesting a control right, and in response, the AP 100 may deliver, to the CP 200, a message for accepting or rejecting the request. If the AP 100 accepts the request of the CP 200, it may then enter a sleep state.

After acquiring a control right from the AP 100 through the control manager 210, the CP 200 may perform various operations, instead of the AP 100. Additionally, the CP 200 may send a message for switching the AP 100 from an inactive state into an active state, based on collected information.

Referring again to FIG. 1, the CP 200 includes a state recognition unit 220, a location estimation unit 230, a network processing unit 240, a state determination unit 250, an operation performance unit 260, a scheduler 270, and a memory 280. At least some of these components of the CP 200 may be configured with hardware. Additionally, operations performed by each of these components may be understood as operations performed by the CP 200. That is, the illustrated configuration of the CP 200 in FIG. 1 is provided for convenience of description and it is sufficient that an operation be performed by the CP 200 and a configuration or an implementation method of the CP 200 should not limited by the name of the configuration.

Additionally, a connection relationship displayed by an arrow in FIG. 1 represents a representative connection relationship and this does not mean that one component limits another communicable component. For example, in addition to the network processing unit 240, other components of the CP 200 may access the memory 280.

The state recognition unit 220 may collect various information from the sensor module 310, the user input unit 320, and the communication module 330. For example, the state recognition unit 220 may collect information on the brightness of a place where the electronic device is located from an illumination sensor and information on a movement of the electronic device or a direction that a display faces from an acceleration sensor. Additionally, the state recognition unit 220 may collect information on whether the electronic device is currently in use by recognizing a touch input or a physical button input. Additionally, the state recognition unit 220 may collect information on whether the electronic device is connected to or pairing with another electronic device, from the communication module 330. The state recognition unit 220 may also provide the collect information to the state determination unit 250.

The location estimation unit 230 may obtain information on the current location of the electronic device from the communication module 330. For example, the location estimation unit 230 may obtain geographic location information of the current electronic device from GPS coordinate information obtained from the GPS module. Additionally, the location estimation unit 230 may obtain location information or correct location information obtained through GPS based on base station information and access point information of Wi-Fi, which are obtained from the communication module 330. The location estimation unit 230 may also provide the obtained information to the state determination unit 250.

The network processing unit 240 may collect information relating to data packet transmission and reception from components of the communication module 330 and perform a filtering operation for analyzing and classifying a specific data packet. For example, when it is determined that a user does not use the electronic device for a predetermined time, if a packet that is a transmission target is a keep-alive message for maintaining a transmission control protocol (TCP) session, the network processing unit 240 may refrain from transmitting packets for a predetermined time (e.g., disconnecting a data connection).

Alternatively, if the received data packet is a chatting application message or a social networking service (SNS) message, which should be notified to a user immediately, by analyzing the received data packet, the network processing unit 240 may provide a notification by using a display, vibration, or sound. In this case, the CP 200 may provide a notification for a corresponding message directly by using a control right (e.g., a display or notification control right) assigned from the AP 100, without waking up the AP 100. However, when it is unnecessary that the received data packet provides a notification to a user immediately, while saving data in the memory 280, the network processing unit 240 may provide a notification for corresponding data at a time point that a use of the electronic device is detected (e.g., lock release and touch input through the user input unit 320).

Additionally, when it is determined that the received data packet is unnecessary, the network processing unit 240 may delete and process corresponding data.

Additionally, the network processing unit 240 may provide state information relating to transmission/reception of data to the state determination unit 250 through the communication module 330.

The state determination unit 250 may check a state of the electronic device or a usage pattern of a user thereof by using information collected from the state recognition unit 220, information on the location of the user (or the electronic device) and whether the user moves, which is collected from the location estimation unit 230, and information collected from the network processing unit 240. The state determination unit 250 may perform a comprehensive determination for the location (e.g., a company or a home) of the user based on a machine learning technique, mobility (e.g., jogging, or inside a running car), and a state of the electronic device (e.g., in a pouch or a bag, or facing downward on a desk) by using the information processing capability of the CP 200. The state determination unit 250 may provide a determination result for a state of the electronic device or the user's situation to the operation performance unit 260.

The operation performance unit 260 may determine whether to control a specific block, a function, ON/OFF of hardware, or an operating period, which is provided from the state determination unit 250. Further, the operation performance unit 260 may perform a specific block control operation such as a period adjustment of data connection, a screen control (e.g., display OFF in a pouch/bag), and a utilization of another internet connected device. For example, according to the determination result, the operation performance unit 260 may maintain only some of an acceleration sensor, a gyro sensor, an illumination sensor, and a grip sensor to be in an active state.

Additionally, the operation performance unit 260 may turn off a screen or control a voice input (e.g., turn off a microphone in an always-on state).

Additionally, the operation performance unit 260 may deactivate a specific communication module (e.g., at least one of WiFi, Bluetooth, and NFC) in the communication module 330.

As described above, the operation performance unit 260 may optimize power consumption by appropriately turning on/off various functions/modules with a control right owned by the CP 200 based on a series of state/situation determination results.

The scheduler 270 may effectively adjust a timing of a process for collecting and processing information of several blocks. For example, the scheduler 270 may determine the information that is to be collected and processed for each period based on the CP 200 operating periodically for a discontinuous reception (DRX) operation in a sleep state of the AP 100. The type of information collected and processed according to a period may be determined differently according to a state of the electronic device, the user's usage pattern, or a change in condition for a control operation of the CP 200.

Although various embodiments of the present disclosure are described below based on a DRX operating period, the present disclosure is not limited thereto and may be utilized at a time point that an operation control by a CP is available. For example, when a specific interrupt occurs or a specific condition is satisfied, the scheduler 270 may set an operation control by the CP 200 at a time point that is not a period of a DRX operation (e.g., at a paging).

Figure 2:
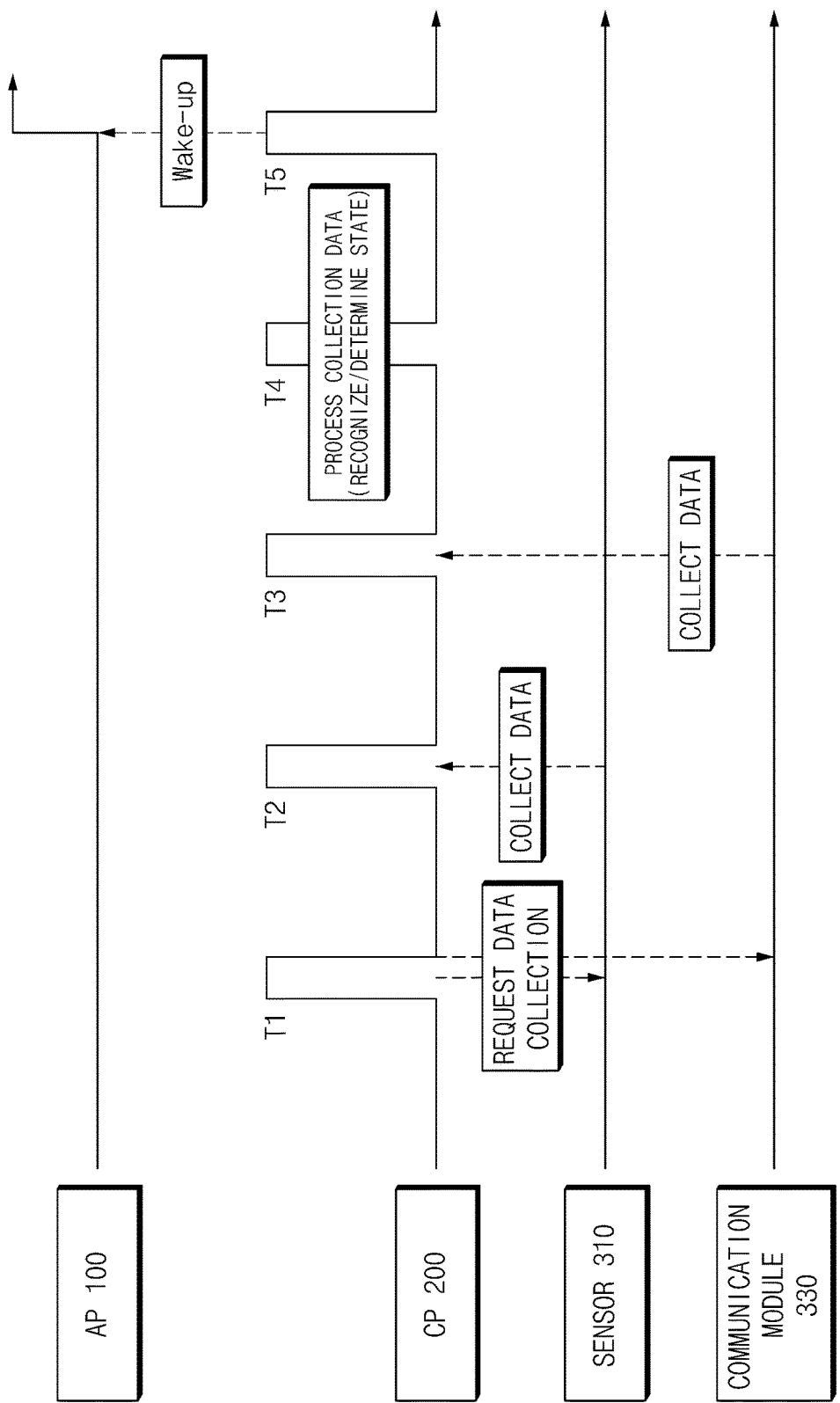
FIG. 2 illustrates scheduling of components in an electronic device depending on an operating period of a CP according to an embodiment of the present disclosure.

FIG. 2 illustrates scheduling of components in an electronic device depending on an operating period of a CP according to an embodiment of the present disclosure.

Referring to FIG. 2, even if the AP 100 is in an inactive state, the CP 200 wakes up periodically due to an LTE DRX operation and checks whether paging is received, e.g., during five periods corresponding to T1 to T5.

When the AP 100 enters an inactive state, the CP 200 may wake up for paging at T1 and transmit, to the sensor 310 and the communication module 330, a data collection request message for the current state of an electronic device during an activation time. This message may be delivered to each component through the state recognition unit 220 and the location estimation unit 230 or the network processing unit 240. This data collection request message may include an instruction for a specific module to perform a desired operation. For example, the data collection request message may include an instruction for the sensor 310 to collect data for a specific factor or for the communication module 330 to collect current location information of the electronic device.

After sending the data collection request message, the CP 200 may wait until a time for the next DRX, i.e., T2. When T2 arrives, the CP 200 may collect data from each component.

In the example illustrated in FIG. 2, the CP 200 performs data collection at T2 with respect to an available immediate data collection component and performs data collection in the next DRX period, i.e., T3, with respect to a component requiring a predetermined time for data collection such as location information. The example illustrated in FIG. 2 is for convenience of description and the CP 200 may also perform data collections in T4 and T5 according to a control of the scheduler 270, and at times thereafter.

When the electronic device enters a power saving mode in which the AP 100 sleeps and the CP 200 operates, the CP 200 may request data collection for determining a state of the electronic device in a first DRX period from each component, and then collect the requested data during a second DRX period. The CP 200 may determine a state of the electronic device during a third DRX period, based on the collected data. The CP 200 may perform a subsequent operation based on the determination in a fourth DRX period, e.g., turning on/off a specific function block by using a control right obtained from the AP 100 or transmitting a message for activating the AP and returning a control right.

For example, the CP 200 may complete data collection by using a CP activation period for DRX operation several times. That is, in FIG. 2, it may be understood that T2 and T3 correspond to the second DRX period described above.

Additionally, the CP 200 may requests GPS information in a first period, collect the GPS information in a second period, and determine the collected information in a third period. Simultaneously, the CP 200 may request another function or another information, for example, acceleration sensor information, in the second period. That is, in the second period, data collection (GPS) and data request (acceleration) may be completed together.

Referring again to FIG. 2, when all of the requested data or at least the essential data is collected, the CP 200 processes the collected data in the next DRX period. For example, the CP 200 determines the current state of the electronic device or a user's situation and determines whether to maintain the inactive state of the AP 100. The CP 200 may determine the state of the electronic device by performing machine-learning through the processing capability of the CP 200.

If it is determined to wake up the AP 100, the CP 200 may transmit a control message (e.g., a wake-up message) to the AP 100 in the next period (e.g., T5).

When receiving the control message, the AP 100, the AP 100 enters an active state, immediately or after a predetermined time.

In FIG. 2, for the AP 100 and the CP 200, "high" represents an active state and "low" represents an inactive state. However, for the sensor 310 and the communication module 330, the arrows simply illustrate timing for the data collection request/data collection description.

According to a control of the CP 200, some modules (e.g., an acceleration sensor) in the sensor module 310 may maintain an active state and the remaining sensors may all enter an inactive state. Additionally, although FIG. 2 illustrates that the CP 200 controls the sensor module 310 and the communication module 330, and collects data relating thereto, it is also possible to control other components (e.g., a display, a voice input module, etc.) and collect data.

In order for a periodic operation of the CP 200, the scheduler 270 may efficiently adjust the timing of several operations for collecting and processing information. Additionally, the scheduler 270 may determine what information is collected and processed in what period according to a state of the electronic device, the user's usage pattern, or a condition change for a control of the CP 200. Controls for a sensor, WiFi, a display, and data connection, which are performed by the operation performance unit 260, may be operated according to periodic characteristics set by the scheduler 270 and an activation request of the AP 100 may be also performed according to periodic characteristics.

Figure 3:
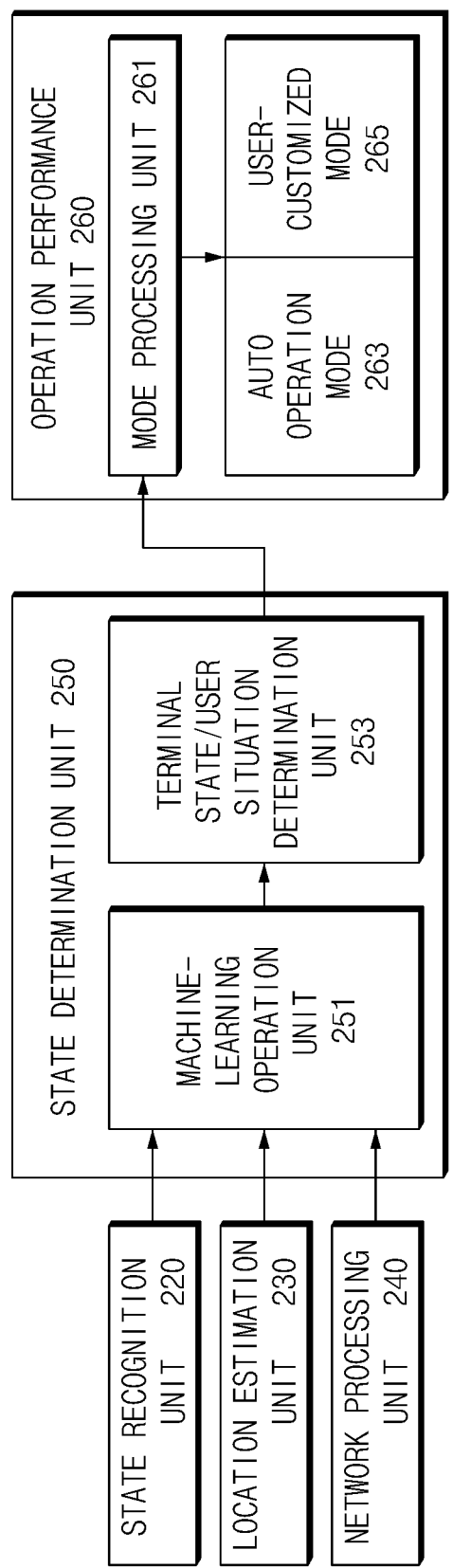
FIG. 3 illustrates operations of a CP for a state determination of an electronic device according to an embodiment of the present disclosure.

FIG. 3 illustrates operations of a CP for a state determination of an electronic device according to an embodiment of the present disclosure.

Referring to FIG. 3, a state determination unit 250 of the CP 200 includes a machine-learning operation unit 251 and a terminal state/user situation determination unit 253. A state recognition unit 220 collects information relating to a sensor or user input, a location estimation unit 230 collects GPS or cellular network related location information, and a network processing unit 240 collects information relating to transmission/reception of a data packet and provides the collected information to the state determination unit 250.

The machine-learning operation unit 251 may distinguish user's various situations or a state of the electronic device by utilizing a machine-learning technique based on the processing capability of the CP 200 itself. Additionally, the machine-learning operation unit 251 may establish a database on a memory 280 of the CP 200 by accumulating the learned data. When an input for requiring another operation different from a state of the electronic device or the user's situation determined based on a learned result occurs, the machine-learning operation unit 251 may update the database by using a corresponding input as feedback.

The terminal state/user situation determination unit 253 may determine the current state of an electronic device or the current situation of a user based on information collected from the state recognition unit 220, the location estimation unit 230, and the network processing unit 240 and an analysis of the machine-learning operation unit 251. Further, the terminal state/user situation determination unit 253 may predict an expected operation that a user wants based on the determined state or situation, e.g., whether the current location of the user (or the electronic device) is a company or a home, whether the terminal is stopped, jogging, or in a vehicle, whether the terminal is in a pouch or a bag, whether the terminal is facing downward on a desk, and/or whether the user is currently exercising, sleeping, in a meeting, or commuting.

For example, when the location estimation unit 230 provides access point information of a WiFi corresponding to a user's home or company, the state determination unit 250 may determine that the electronic device is in the home or the company. The state determination unit 250 may check whether the electronic device is stopped, based on values of an inertial sensor or an acceleration sensor, which are provided from the state recognition unit 220. When the electronic device moves at a speed corresponding to a moving speed of a vehicle at a time slot, the machine-learning operation unit 251 may learn that this time slot is the user's commuting time.

If it is determined that the electronic device is currently disposed in a dark place based information of a proximity sensor or an illumination sensor, which is provided from the state recognition unit 220, the state determination unit 250 may determine that the electronic device is in a pouch or a bag.

When the current time is learned as the user's sleeping time and information obtained from components of the electronic device represents a specific state (e.g., an illumination sensor—dark, an inertial sensor—no movement, and a power management module—battery charging), the state determination unit 250 may determine that the user is sleeping.

The states of the electronic device or the user determined by the state determination unit 250 are not limited to the above-described examples.

The state determination unit 250 may predict an operation that a user wants, e.g., may predict that a user the user is in a state where no notification should occur, e.g., when sleeping, in a meeting, or while exercising.

Additionally, when the electronic device is in a pouch or a bag, even if a display is turned on and a screen notification is provided, a user cannot see it, so that a user may not want unnecessary power consumption. In this case, the state determination unit 250 may determine that a user wants to omit a screen notification in order to minimize power consumption and only receive a notification through sound or vibration.

Additionally, when a user is at a specific location, e.g., when a user arrives home, the state determination unit 250 may predict that a user wants to connect between a note PC or a tablet and a user terminal through BT.

Determination of content and a user's desired operation may be input by a user or may be generated automatically through a machine-learning technique. Operation patterns input or generated in such a manner may be stored in and managed by the memory 280 in the CP 200.

When obtaining a determination result (e.g., information on a terminal state or a user situation) from the state determination unit 250, the operation performance unit 260 may control ON/OFF of a specific block (or a function) or an operating period based on the obtained determination result.

The operation performance unit 260 may include a mode management unit or perform a mode management function.

An auto operating mode 263 and a user-customized mode 265 registered by the mode processing unit 261 and the mode processing unit 261 may be managed by a mode management unit. The mode processing unit 261 may classify various modes input by a user or generated by machine-learning into the auto operating mode 263 or the user customized mode 265 and register the classified modes. Additionally, the mode processing unit 261 may delete a registered mode.

The auto operating mode 263 may include auto modes generated through a machine-learning technique, e.g., a display OFF mode, a sleeping mode, an indoor mode, and an outdoor mode. The user customized mode 265 may correspond to a user mode directly generated by a user, which is appropriate for a routine work required from a user's point of view, e.g., meeting, exercise, recreation, and relaxation. For example, a user may directly set items for monitoring, notification methods, sensors, call/SMS receptions, application specific operations, and lock screens through the user input unit 320.

For example, a user may set an idle mode in which push notification OFF, call receiving rejection, and SMS reception allowing states of all applications may be set. In this case, when the electronic device enters the idle mode, the CP 200 may store all push notifications received from the network processing unit 240 in the memory 280 without providing notifications, and may notify the user of only received SMSs, without providing call notifications. Additionally, the operation may be performed in an appropriate DRX period as described above.

As the user-customized mode 265 and the auto operating mode 263 coexist, a situation that several modes are required to operate at the same time under a specific situation may occur. For example, as an auto operating mode for sleeping state and a user-customized mode that a user sets for a sleeping situation coexist, this may lead to a conflict.

In this case, the above-described mode management unit operates one of two modes first or may display a message for allowing a user to check conflicting parts in the two modes. A mode management unit allows the electronic device to operate based on an arbitrary mode and when a sleep state of the AP 100 is released, reports (or displays) which mode operates among available several modes to a user, and receives feedback, which may be stored in the memory 280 and used to update data.

Figure 4:
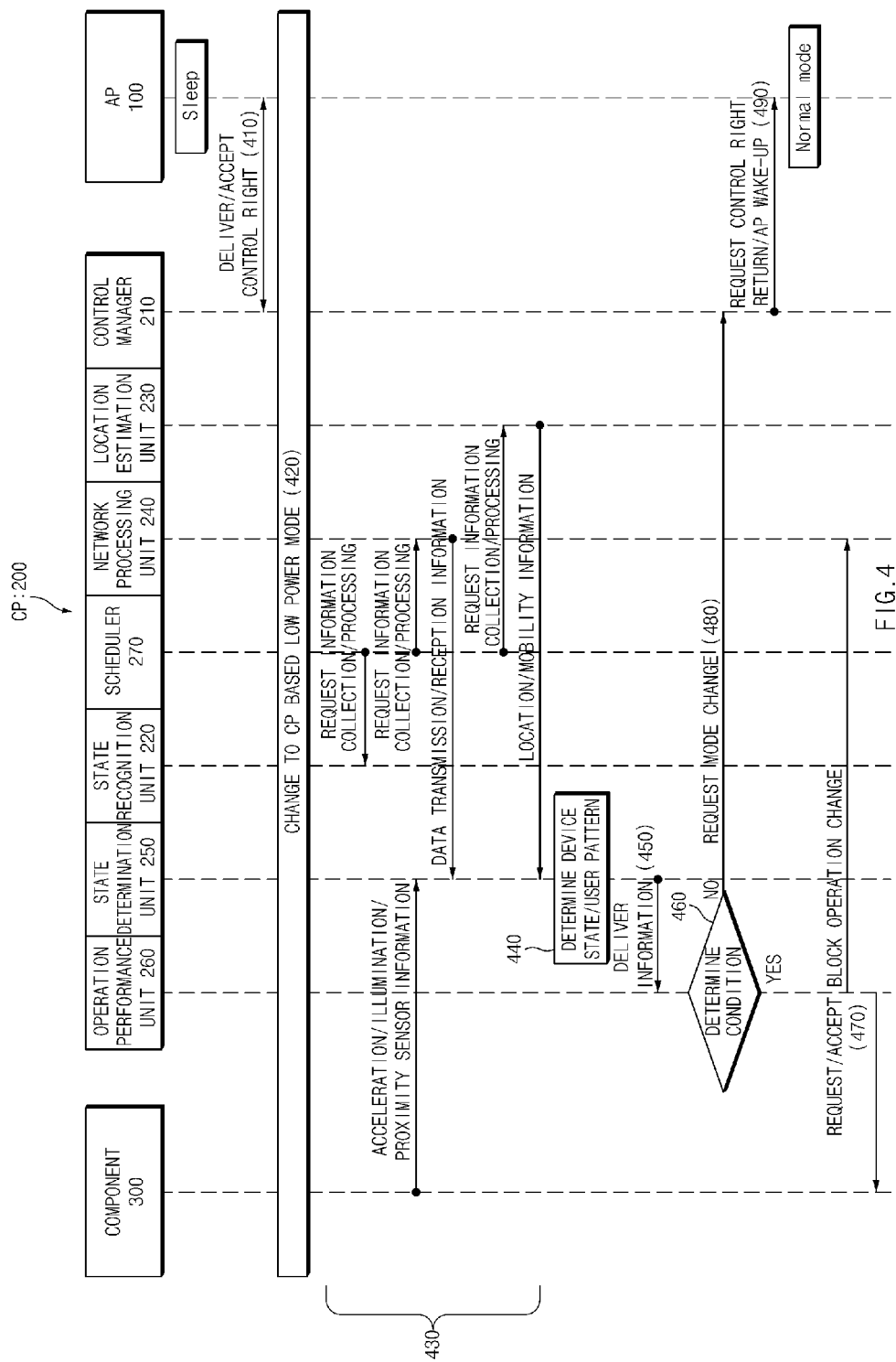
FIG. 4 is a signal flow diagram illustrating CP operations based on a low power mode operation and a low power mode release according to an embodiment of the present disclosure.

FIG. 4 is a signal flow diagram illustrating CP operations based on a low power mode operation and a low power mode release according to an embodiment of the present disclosure.

Referring to FIG. 4, when the AP 100 enters a sleep state, the AP 100 delivers a block control right to the control manager 210 of the CP 200 in operation 410. When the CP 200 accepts the block control right, the electronic device enters a CP based low power mode.

Operation 410 may be performed immediately as the AP 100 enters a sleep state, a predetermined time after the AP 100 enters a sleep state, or if a predetermined condition is satisfied, after the AP 100 enters a sleep state.

In operation 420, the electronic device enters the CP based low power mode, and controls some functions with the control right assigned from the AP 100. For example, when receiving a screen control right from the AP 100, the CP 200 may display a message or notification by controlling a display, without waking up the AP 100.

When the electronic device enters the CP based low power mode in operation 420, the following operations may be performed according to a DRX period.

In operation 430, the CP 200 may collect information from the components 300 such as the sensor module 310 or the communication module 330 in order to determine a state of an electronic device or a situation of a user of an electronic device. In this case, an information collection/processing request from the scheduler 270 to the state recognition unit 220 may be processed in a first DRX period. Acquisition for information collected from an acceleration/illumination/proximity sensor and an information collection/processing request to the network processing unit 240 may be processed in a second DRX period. Data transmission/reception information from the network processing unit 240 may be processed in a third DRX period. Such scheduling is exemplary and it is sufficient that an operation performed by the CP 200 is performed during a time that the CP 200 operates for a DRX operation.

Although FIG. 4 illustrates the scheduler 270 requesting information from each of the state recognition unit 220, the location estimation unit 230, and the network processing unit 240, and the corresponding information being collected by the state determination unit 250, each information collection request may be delivered to a corresponding external module/component. For example, when the scheduler 270 requests information collection from the state recognition unit 220 or when corresponding information is information on an acceleration of an electronic device, the state recognition unit 220 requests information from an acceleration sensor. From the CP 200's perspective view, the CP 200 requests the current acceleration information of the electronic device from an acceleration sensor at a specific DRX operating time point and after that, fetches requested information at an arbitrary DRX operating time point. In a similar manner, an information request to the network processing unit 240 may be provided to a specific communication module 330. The information request to the location estimation unit 230 is delivered to a cellular module or GPS.

In operation 440, based on information collected from several components, the state determination unit 250 determines the current state of the electronic device or a user's usage pattern. For example, the state determination unit 250 determines that the display of the electronic device is currently laid facing the desktop surface or that the electronic device is currently in a pouch or a bag.

In operation 450, the state determination unit 250 delivers the determination result to the operation performance unit 260.

In operation 460, the operation performance unit 260 determines whether there is a corresponding condition (or mode) in the delivered determination result. For example, when it is determined in operation 470 that the determination result corresponds to a display OFF mode, the operation performance unit 260 may request a display (e.g., the user input unit 320) to be maintained in an OFF state. As another example, when the determination result indicates that a user is in a sleeping state, operations of the remaining sensors, except for a specific sensor, are changed to OFF or WiFi, Bluetooth, and NFC modules, except for cellular communication, may be all changed into an inactive state.

Operations 430 to 470 may be continuously performed in order to optimize current consumption.

If there is no condition (or mode) corresponding to the determination result (or it is determined to wake up the AP 100) in operation 460, the operation performance unit 260 requests a mode change from the control manager 210 in operation 480. For example, when a button input by a user is detected or it is detected that a display facing a desktop surface (or a bottom surface) is changed to face the top, it is determined that the activation of the AP 100 is required. When receiving a mode change request, the control manager 210 delivers an AP activation request message to the AP 100 in addition to the control right return to the AP 100 in operation 490. When receiving the request of operation 490, the AP 100 releases a sleep state and enters a normal mode.

Figure 5:
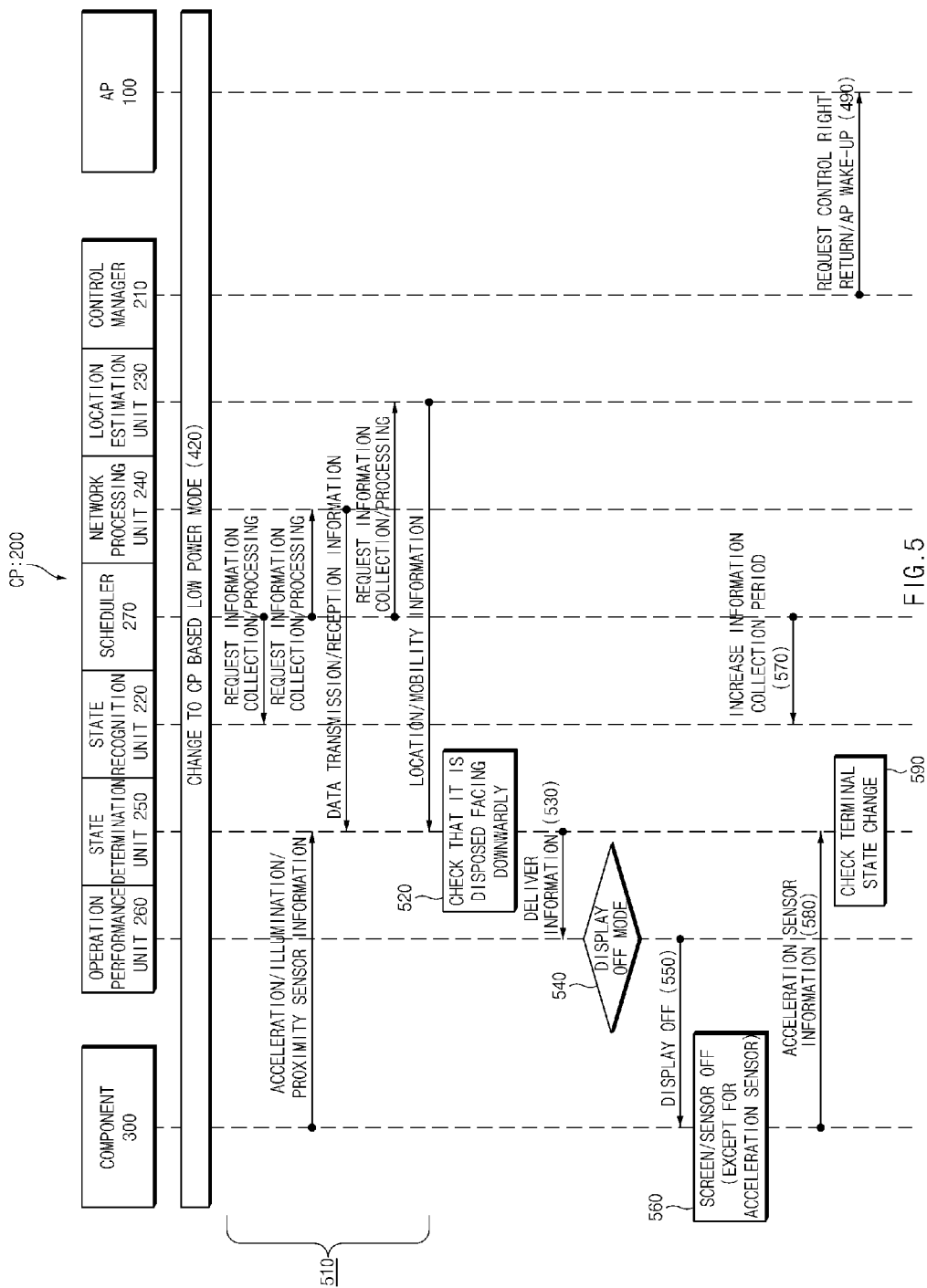
FIG. 5 is a signal flow diagram illustrating CP operations based on a low power mode operation and a low power mode release according to another embodiment of the present disclosure.

FIG. 5 is a signal flow diagram illustrating CP operations based on a low power mode operation and a low power mode release according to another embodiment of the present disclosure. In to the description of FIG. 5, descriptions for contents overlapping, corresponding to, or similar to those already described above in relation to FIGS. 1-4 may be omitted.

In FIG. 5, the electronic device enters the CP based low power mode in operation 420.

In operation 510, according to scheduling of the scheduler 270, the CP 200 obtains various sensor information and information on transmission/reception data or a location according to an appropriate DRX operating period. This process may correspond to operation 430 of FIG. 4.

In operation 520, the state determination unit 250 of the CP 200 determines the current state of an electronic device. For example, the state determination unit 250 may check whether the electronic device is currently facing downward on a desktop. More specifically, the state determination unit 250 may determine whether the display of the electronic device faces down by using information obtained from an acceleration sensor.

In operation 530, the state determination unit 250 may deliver information according to the determination of operation 520 to the operation performance unit 260.

In operation 540, the operation performance unit 260 determines an operating mode corresponding to a current condition of an electronic device, based on information received from the state determination unit 250. For example, when it is determined in operation 520 that the display of the electronic device is disposed in a down direction, it is determined that a display OFF mode is applicable.

In operation 550, the operation performance unit 260 transmits a control message (e.g., DISPLAY OFF) to a component (e.g., a display) that is an application target of a display OFF mode.

In operation 560, the CP 200 turns off (or de-activates) all other sensors, except for an acceleration sensor for determining a release condition of the display OFF mode.

Alternatively, the CP 200 may turn on specified sensors in a specific mode and maintain unspecified sensors or sensors to be essentially turned on in an ON state.

In operation 560, if a display is set to be in an OFF state, even when a notification is received or a notification event occurs, providing a notification through display ON may be limited. However, even if in this case, a notification through sound or vibration may be provided according to a setting.

In operation 570, the scheduler 270 increases an information collection period. For example, although the CP 200 is capable of checking acceleration sensor information in each DRX operating period, under a situation that there is no special movement in the electronic device, if acceleration sensor information is checked in an Nth DRX operating period, the CP 200 may not request acceleration sensor information in an N+1th operating period. The CP 200 may monitor changes in a state that an electronic device is disposed and changes in a state that a DISPLAY OFF mode is released as appropriate for increasing a time point for checking acceleration sensor information.

According to an information collection period adjusted in operation 570, the state determination unit 250 collects acceleration sensor information in operation 580.

In operation 590, the state determination unit 250 checks a state change of a terminal and determines whether to maintain the DISPLAY OFF mode or whether to wake up the AP 100. If it is determine to wake up the AP 100, an operation corresponding to operation 480 or 490 of FIG. 4 may be performed.

In FIG. 5, when an electronic device is disposed facing downwardly, an operation for turning off the display is described. However, the same mode may be performed under different conditions. For example, in operation 510, if it is determined that the surroundings of the electronic device are dark through an illumination sensor, the operation performance unit 250 may determine that the electronic device is in a bag or a pouch by synthesizing illumination information and current time information. In such a case, the operation performance unit 260 may transmit a control message (in operation 550) for turning off the display to the component 300.

Besides the above-described embodiment, the CP 200 may perform a power saving operation through various methods based on several information obtained by the electronic device. For example, when the display of the electronic device is disposed facing upwardly in operation 520, the state determination unit 250 may determine the current state of the electronic device by synthesizing various other information. For example, if it is determined by the location estimation unit 230 that there is no movement of the electronic device when the electronic device is disposed facing upwardly, the state determination unit 250 may synthesize corresponding information and provide it to the operation performance unit 260. The operation performance unit 260 may determine whether the current state condition corresponds to the auto operating mode 263 or the user-customized mode 265 based on information provided.

For example, if it is determined with reference to a schedule, a time, and location information of the current electronic device by the operation performance unit 260 that the current electronic device corresponds to an arbitrary user-customized mode 265 (e.g., a meeting mode), the operation performance unit 260 may transmit a control message to each component to appropriately operate in a corresponding mode. For example, all notification OFF or mute notification through DISPLAY ON without sound or vibration may be set.

Alternatively, transmission/reception data are stored in the memory 280 and provided if a meeting mode is released.

Figure 6:
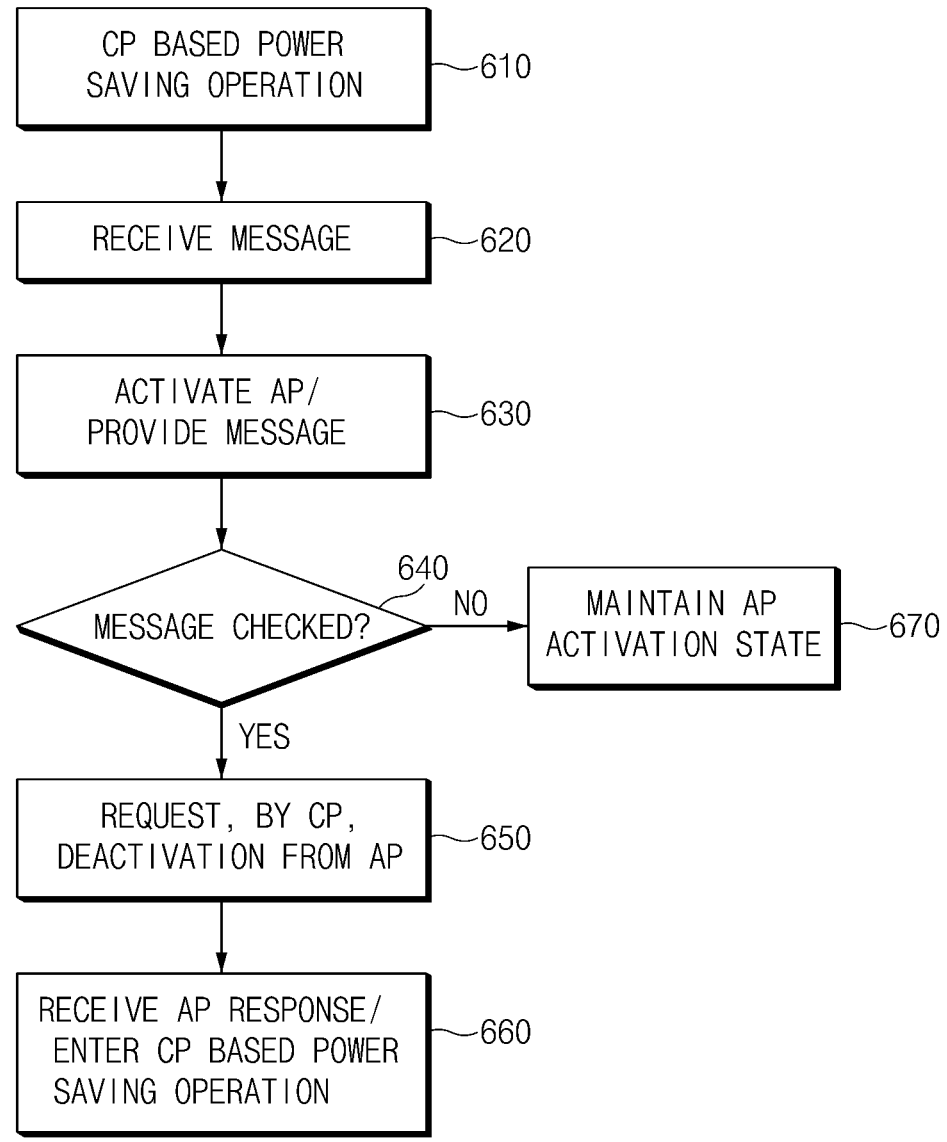
FIG. 6 is a flowchart illustrating a method of a CP based low power mode entry according to an embodiment of the present disclosure.

FIG. 6 is a flowchart illustrating a method of a CP based low power mode entry according to an embodiment of the present disclosure.

Referring to FIG. 6, in operation 610, an electronic device may perform a CP based power saving operation. For example, when the AP 100 of the electronic device enters a sleep state, it provides a control right for some functions to the CP 200. The CP 200 may be in power saving by collecting state information of the electronic device according to a DRX operating period and activating only a minimum function.

In operation 620, the CP 200 receives a message (e.g., a notification message of an SMS or an application). The message may be received from the outside or may correspond to an event occurring from inside.

In operation 630, the CP 200 delivers a control right return and AP activation message to the AP 100. The AP 100 may wake up to provide a notification for corresponding message through the display of the electronic device. In operation 630, the CP 200 may transmit, to the AP 100, the message (e.g., a notification message) and a request message for the AP 100 to perform a specified operation together (simultaneously) in order to allow the AP 100 to perform a specified operation as soon as the AP 100 wakes up. The specified operation may be variously set according to the type of message. For example, for an SMS message, the CP 200 may transmit a request message for generating vibration or sound as soon as the AP wakes up.

In variously 640, it is determined whether a user response for the message occurs. If a response occurs, the CP 200 maintains an AP activation state in operation 670.

However, if no response occurs in operation 640, in operation 650, the CP 200 does not wait until the AP 100 enters a sleep state and delivers a deactivation request message to the AP 100. That is, in typical cases, when the AP 100 enters an inactive state, a predetermined time elapses after the entry, or a predetermined condition is satisfied, a CP based power saving mode entry is completed by a request of the AP 100. However, as illustrated in FIG. 6, the electronic device may enter a power saving mode when the AP 100 is changed into an inactive state in response to a request from the CP 200.

In operation 660, the CP 200 receives a response for the request in operation 650 from the AP 100. If accepting the request, the AP 100 may enter a sleep state and the CP 200 may obtain a control right for at least some functions for controlling the electronic device. If the AP 100 rejects the request, the electronic device may operate in a normal mode (for example, operation 670) in which the AP 100 maintains an active state.

Figure 7:
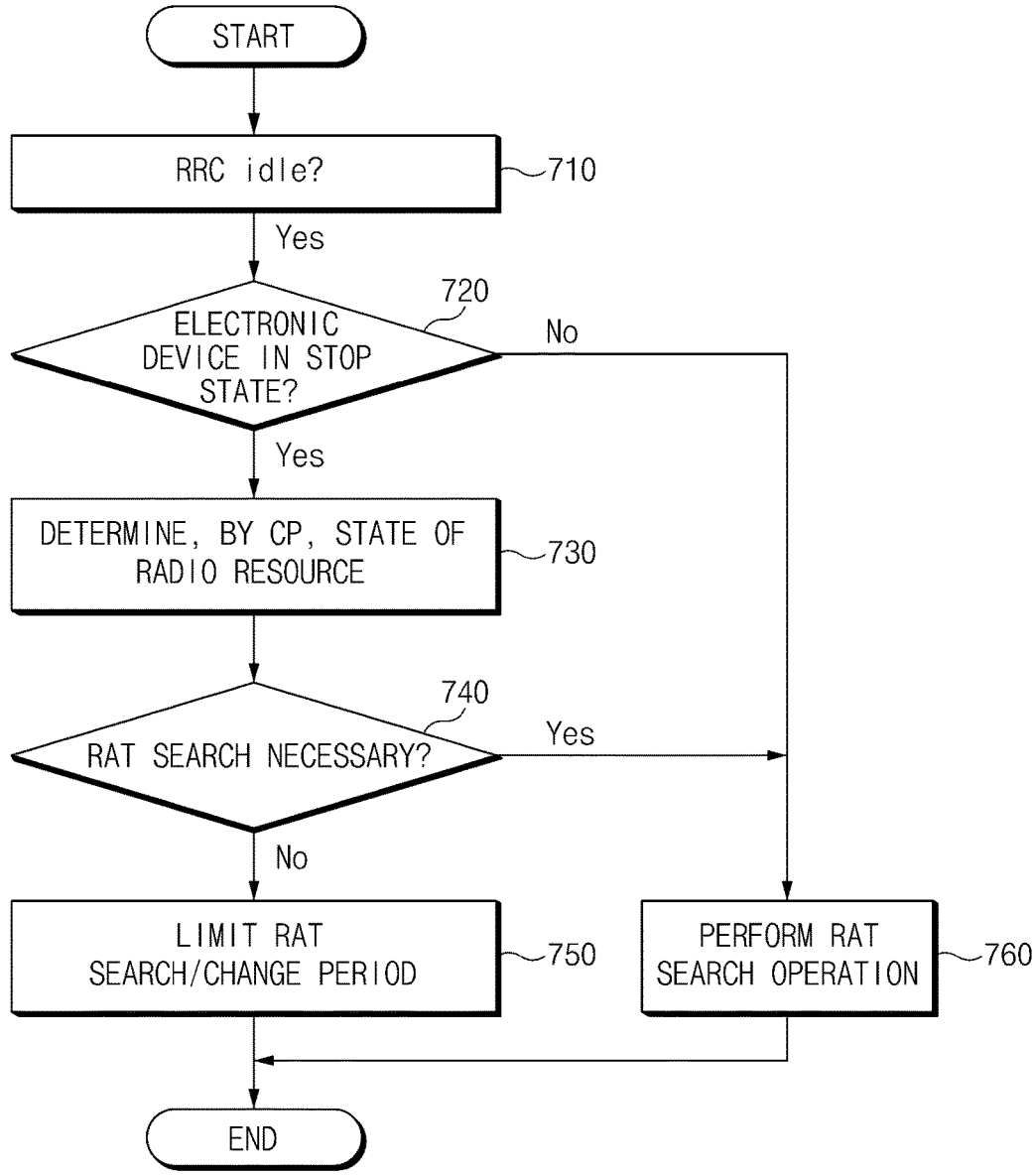
FIG. 7 is a flowchart illustrating a method of a CP based Radio Access Technology (RAT) search control process according to an embodiment of the present disclosure.

FIG. 7 is a flowchart illustrating a method of a CP based RAT search control process according to an embodiment of the present disclosure.

According to an embodiment of the present disclosure, instead of a Radio Resource Control (RRC) Connected mode for exchanging data with a base station, even in an RRC Idle mode, a CP may perform continuous search with respect to several other frequencies and/or other RATs. For example, available frequency (band) search and the signal intensity measurement of the found frequency may be performed with respect to a communication method such as 2G, 3G, or LTE.

In the description below, when an electronic device is in an RRC idle mode, an operation for searching and measuring a radio resource for continuous service of wireless communication is referred to as RAT search. Herein, the RAT search includes all searches of radio resources for communication service, e.g., search for the same frequency as a serving cell or a different frequency in LTE RAT (e.g., LTE intra-frequency, LTE inter-frequency, Inter-RAT (UTRA, 3G), and inter-RAT (GSM, 2G)) and public land mobile network (PLMN) search. Such a RAT search operation causes power consumption of an electronic device.

FIG. 7 is a flowchart illustrating a process for reducing power consumption by determining an unnecessary search operation and controlling a RAT search operation.

Referring to FIG. 7, in operation 710 the CP 200 enters an RRC idle mode.

For example, when information that data transfer starts is delivered from the AP 100 to the CP 200, the CP 200 may maintain an RRC Connected mode (or change to an RRC Connected mode). If information (e.g., termination information of data transfer) that there is no data to be transferred any more is delivered from the AP 100 to the CP 200, the CP 200 may enter an RRC idle mode. That is, information on data transfer provided from the AP 100 may be a criterion for enabling/disabling a CP based RAT search operation.

In operation 720, the CP 200 determines whether the electronic device is in a stop state (or a stationary state). Herein, the stationary state comprises the stop state and a state in which the possibility that the electronic device moves out from a current serving cell is very low since the electronic device is moving very slow. In this case, because continuous network service is provided from a serving cell, another RAT search operation may be unnecessary. However, under a specific condition, even when the electronic device is in a stop or stationary state, another RAT search operation is performed.

The CP 200 may obtain information on the movement of an electronic device from a sensor (e.g., the sensor 310 and the communication module 330 of FIG. 1) outside the CP 200. For example, the CP 200 may request a state for the movement of the electronic device from the sensor 310 (e.g., an acceleration sensor) or the communication module 330 (e.g., a GPS sensor) and may determine whether the electronic device is in a stop (stationary) state currently by obtaining movement state information from a response to this request. This operation may be performed in a DRX period of the CP 200.

For example, referring to FIG. 2, while entering an RRC idle mode, the CP 200 may request a movement state at T1 and obtain movement state information at T2 or T3. If the electronic device is not in a stop state based on a determination result, the CP 200 may perform a RAT search operation. Of course, the CP 200 may perform a RAT search operation in all DRX periods such as T1, T2, and T3 and the expression that a RAT search operation is performed in a specific period in relation to FIG. 7 does not exclude a RAT search operation in the previous DRX period. However, based on information collected in each DRX period, the CP 200 may check several conditions for RAT search and may perform an RAT search in a different method or limit (omit) the RAT search itself.

For example, when the electronic device is in a stop state based on the determination result, if a condition after operation 730 is satisfied, the CP 200 may omit a RAT search operation in a DRX period, after operation 720 is performed or may change an operating period.

If it is determined that the electronic device is in a stop state in operation 720, the CP 200 determine a state of a radio resource in operation 730. This operation may be performed by the CP 200 itself. That is, FIG. 7 may be implemented by triggering the entire process by the AP 100, a state determination of the electronic device by a component outside the CP 200, and a state determination of a radio resource by the CP 200.

The CP 200 may collectively monitor a network status of a current network (or a current serving cell), a signal status of another frequency/RAT, and a signal change status of a serving cell. For example, if a signal status of a current serving cell is poor (e.g., less than a standard received signal strength indicator (RSSI) value) or a neighbor cell and a serving cell have a similar signal level, even when the electronic device is in a stop state, the CP 200 may perform cell reselection as a signal level is changed by fading. Herein, the fading means that signals received by an electronic device are changed by a change of surrounding environment (e.g., people around, a movement of an object, and a change in signal) even when it is determined that the electronic device stops, e.g., when the electronic device is laid on a table.

Accordingly, in operation 730, the CP 200 determines a state of a radio resource such as the signal intensity of a serving cell and/or a neighbor cell. Besides that, the CP 200 may determine a previous search/measure time and radio signal condition for various frequencies.

For example, the CP 200 may omit a search/measure operation continuously after a search/measure time for specific frequency, and if it is determined that a predetermined time elapses after the search/measure time, perform a search/ measure operation on a specific frequency again. Through such an operation, it is possible to prevent an issue occurring from communication service.

In operation 740, the CP 200 may determine whether a RAT search is necessary based on the information collected in operations 720 and 730.

If it is determined that the RAT search is unnecessary, the CP 200 limits RAT search or change a search period in operation 750. For example, during a DRX operation, the CP 200 may block a RAT search or may lengthen a search period (e.g., perform a RAT search once, when DRX is repeated five times).

If it is determined that a RAT search is necessary, e.g., if it is determined that the electronic device is moving or a network state is unstable, the CP 200 may continuously perform an RAT search operation in operation 760.

Even if power consumption is reduced by limiting a RAT search or lengthening a period of a RAT search, when it is determined that such an operation affects the connectivity performance of the electronic device, the limitation of the RAT search may be released. For example, when several exit conditions are satisfied by using various information, for example, when a condition that an out of service (OOS) state is likely to occur by a RAT search limitation being satisfied, the CP 200 may release the limitation of RAT search.

For example, if it is determined that a terminal is out of a stationary state, the CP 200 may release the RAT search limitation in consideration of exit conditions such as when an reference signal received power (RSRP) value of a serving cell is changed more than a predetermined level when a frequency specific RAT search is blocked for more than a predetermined time, and when an RSRP value of a serving cell is less than a predetermined value.

Figure 8:
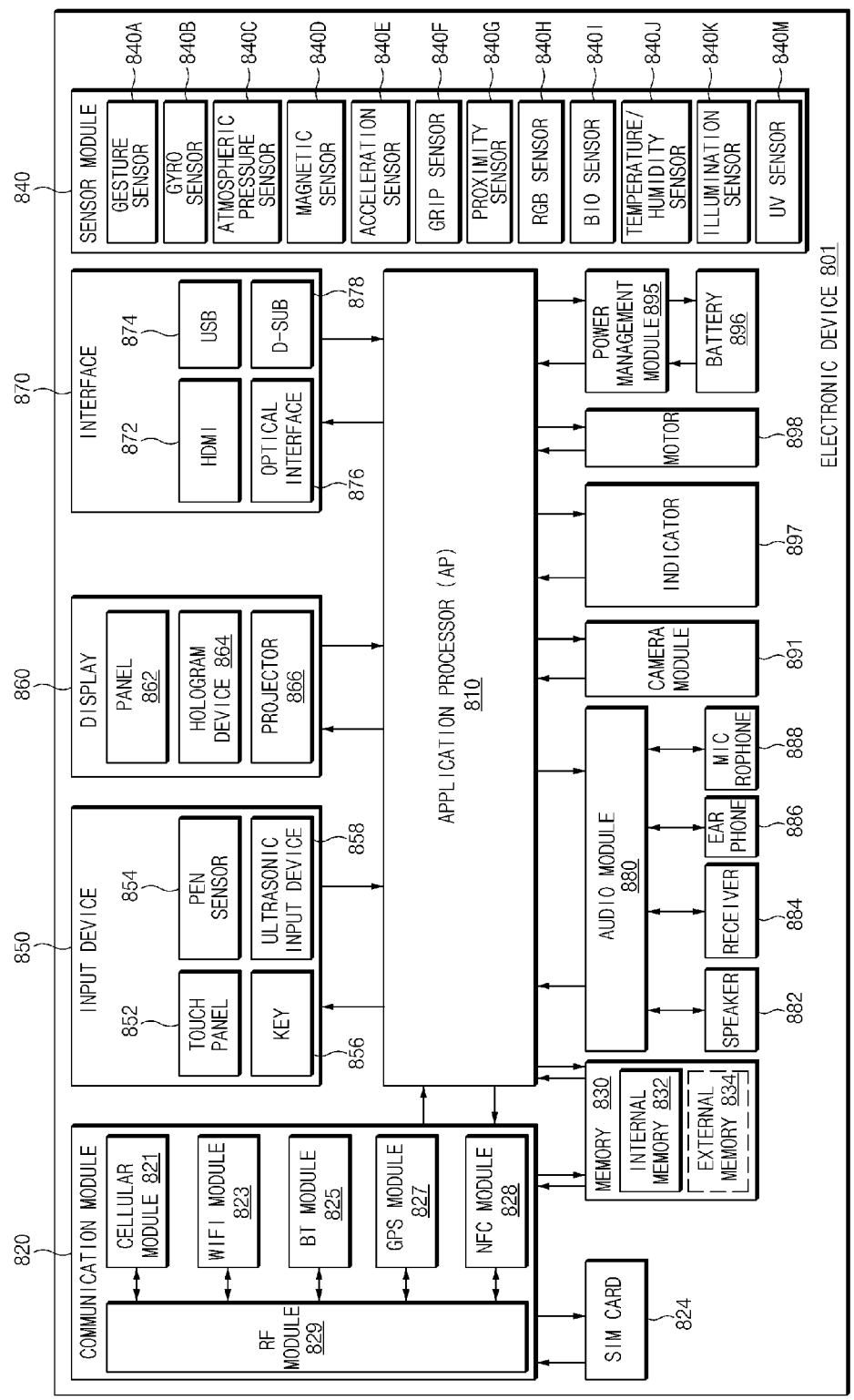
FIG. 8 illustrates an electronic device according to an embodiment of the present disclosure.

FIG. 8 illustrates an electronic device according to an embodiment of the present disclosure.

Referring to FIG. 8, the electronic device 800 includes a processor 810, a communication module 820, a subscriber identification module (SIM) 824 card, a memory 830, a sensor module 840, an input device 850, a display 860, an interface 870, an audio module 880, a camera module 891, a power management module 895, a battery 896, an indicator 897, and a motor 898.

The processor 810 may control a plurality of hardware or software components connected thereto and also may perform various data processing and operations by executing an OS or an application program. The processor 810 may be implemented with an SoC. The processor 810 may further include a graphic processing unit (GPU) and/or an image signal processor. The processor 810 may include at least part (e.g., the cellular module 821 or the GPS module 827) of components illustrated in FIG. 8. The processor 810 may load commands or data received from at least one of other components (e.g., a nonvolatile memory) and process them and store various data in the nonvolatile memory.

The communication module 820 includes a cellular module 821, a WiFi module 823, a BT module 825, a GPS module 827, an NFC module 828, and an RF module 829.

The cellular module 821, for example, may provide voice call, video call, text service, or internet service through communication network. The cellular module 821 may perform a distinction and authentication operation on the electronic device 800 in a communication network by using the SIM card 824.

Each of the WiFi module 823, the BT module 825, the GPS module 827, and the NFC module 828 may include a processor for processing data transmitted/received through a corresponding module. At least part (e.g., at least one) of the cellular module 821, the WiFi module 823, the BT module 825, the GPS module 827, and the NFC module 828 may be included in one integrated chip (IC) or IC package.

The RF module 829, for example, may transmit/receive communication signals (e.g., RF signals). The RF module 829 may include a transceiver, a power amp module (PAM), a frequency filter, a low noise amplifier (LNA), or an antenna. At least one of the cellular module 821, the WiFi module 823, the Bluetooth module 825, the GPS module 827, and the NFC module 828 may transmit/receive RF signals through a separate RF module.

The SIM 824 card may include a SIM and/or an embedded SIM and also may include unique identification information (e.g., an integrated circuit card identifier (ICCID)) or subscriber information (e.g., an international mobile subscriber identity (IMSI)).

The memory 830 includes an internal memory 832 or an external memory 834. The internal memory 832 may include at least one of a volatile memory, such as dynamic RAM (DRAM), static RAM (SRAM), synchronous dynamic RAM (SDRAM)) and a non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash memory or NOR flash memory), hard drive, or solid state drive (SSD).

The external memory 834 may include a flash drive, such as a compact flash (CF), secure digital (SD), micro Micro-SD, Mini-SD, extreme digital (xD), MultiMediaCard (MMC), or a memorystick. The external memory 834 may be functionally and/or physically connected to the electronic device 800 through various interfaces.

The sensor module 840 measures physical quantities or detects an operating state of the electronic device 800, thereby converting the measured or detected information into electrical signals. The sensor module 840 may include at least one of a gesture sensor 840A, a gyro sensor 840B, a barometric pressure sensor 840C, a magnetic sensor 840D, an acceleration sensor 840E, a grip sensor 840F, a proximity sensor 840E a color sensor 840H (for example, a red, green, blue (RGB) sensor), a biometric sensor 840I, a temperature/humidity sensor 840J, an illumination sensor 840K, and an ultra violet (UV) sensor 840M. Additionally or alternatively, the sensor module 840 may include an E-nose sensor, an electromyography (EMG) sensor, an electroencephalogram (EEG) sensor, an electrocardiogram (ECG) sensor, an infra red (IR) sensor, an iris sensor, or a fingerprint sensor. The sensor module 840 may further include a control circuit for controlling at least one sensor therein.

The input device may include a touch panel 852, a (digital) pen sensor 854, a key 856, or an ultrasonic input device 858. The touch panel 852 may use at least one of capacitive, resistive, infrared, or ultrasonic methods, for example. Additionally, the touch panel 852 may further include a control circuit. The touch panel 852 may further include a tactile layer to provide tactile response to a user.

The (digital) pen sensor 854 may include a sheet for recognition as part of a touch panel or a separate sheet for recognition.

The key 856 may include a physical button, an optical key, or a keypad.

The ultrasonic input device 858 may detect ultrasonic waves generated from an input tool through a microphone (for example, the microphone 888) in order to check data corresponding to the detected ultrasonic waves.

The display 860 includes a panel 862, a hologram device 864, and a projector 866. The panel 862 may be implemented to be flexible, transparent, or wearable, for example. The panel 862 and the touch panel 852 may be configured with one module. The hologram 864 may show three-dimensional images in the air by using the interference of light. The projector 866 may display an image by projecting light on a screen. The screen may be placed inside or outside the electronic device 800. The display 860 may further include a control circuit for controlling the panel 862, the hologram device 864, or the projector 866.

The interface 870 includes a high-definition multimedia interface (HDMI) 872, a universal serial bus (USB) 874, an optical interface 876, or a D-subminiature (sub) 878. Additionally or alternatively, the interface 870 may include a mobile high-definition link (MHL) interface, a secure Digital (SD) card/multi-media card (MMC) interface, or an infrared data association (IrDA) standard interface.

The audio module 880 converts sound into electrical signals and convert electrical signals into sounds. The audio module 880 may process sound information inputted/outputted through a speaker 882, a receiver 884, an earphone 886, and/or the microphone 888.

The camera module 891, which captures still images and video, may include at least one image sensor (e.g., a front sensor or a rear sensor), a lens, an image signal processor (ISP), or a flash (e.g., an LED or a xenon lamp).

The power management module 895 may manage the power of the electronic device 800. The power management module 895 may include a power management IC (PMIC), a charger IC, or a battery gauge. The PMIC may have a wired and/or wireless charging method. The wireless charging method may include a magnetic resonance method, a magnetic induction method, or an electromagnetic method. An additional circuit for wireless charging, for example, a circuit such as a coil loop, a resonant circuit, or a rectifier circuit, may be added. The battery gauge may measure the remaining amount of the battery 896, or a voltage, current, or temperature thereof during charging. The battery 896, for example, may include a rechargeable battery and/or a solar battery.

The indicator 897 may display a specific state of the electronic device 800 or part thereof (e.g., the processor 810), a booting state, a message state, or a charging state.

The motor 898 may convert electrical signals into mechanical vibration and may generate vibration or haptic effect.

Although not illustrated in the drawings, the electronic device 800 may include a processing device (e.g., a GPU) for mobile TV support. A processing device for mobile TV support may process media data according to the standards such as digital multimedia broadcasting (DMB), digital video broadcasting (DVB), or mediaFLO®.

Each of the above-mentioned components of the electronic device according to the above-described embodiments of the present disclosure may be configured with at least one component and the name of a corresponding component may vary according to the kind of an electronic device. According to various embodiments of the present disclosure, an electronic device according to various embodiments of the present disclosure may include at least one of the above-mentioned components, may not include some of the above-mentioned components, or may further include another component. Additionally, some of components in an electronic device according to various embodiments of the present disclosure are configured as one entity, so that functions of previous corresponding components are performed identically.

According to various embodiments of the present disclosure, power consumption may be reduced by performing a corresponding operation through the calculation capability of a CP itself, without activating an AP in order for a specific operation when the AP enters a sleep state by utilizing a periodic repetition operation for the DRX paging reception check of the CP. Additionally, power consumption of an electronic device may be optimized by deactivating operations determined unnecessary for the current state of the electronic device by performing information collection, state determination, and function control at the timing that a CP is in an active state.

Herein, the term "module" may mean a unit including a combination of at least one of hardware, software, and firmware. The term "module" and the terms "unit", "logic", "logical block", "component", and "circuit" may be interchangeably used.

A "module" may be a minimum unit or part of an integrally configured component. A "module" may be a minimum unit performing at least one function or part thereof. A "module" may be implemented mechanically or electronically. For example, "module" may include at least one of an application-specific integrated circuit (ASIC) chip performing certain operations, field-programmable gate arrays (FPGAs), or a programmable-logic device, all of which are known or to be developed in the future.

According to various embodiments of the present disclosure, at least part of a device (e.g., modules or functions thereof) or a method (e.g., operations) according to this disclosure, for example, as in a form of a programming module, may be implemented using an instruction stored in computer-readable storage media.

For example, a computer readable storage medium according to various embodiments of the present disclosure includes instructions, which instruct the electronic device to control a CP to obtain a control right for at least some functions from an AP when the instructions are executed in the AP or CP of the electronic device, collecting information from a sensor module or a communication module of the electronic device according to a DRX operating period of the CP, determining a state of the electronic device based on the collected information according to the DRX operating period, and controlling the some functions based on the state of the electronic device according to the DRX operating period. Besides that, instructions for performing the above-mentioned various operations may be stored in the storage medium.

A module or a programming module according to various embodiments of the present disclosure may include at least one of the above-mentioned components, may not include some of the above-mentioned components, or may further include another component. Operations performed by a module, a programming module, or other components according to various embodiments of the present disclosure may be executed through a sequential, parallel, repetitive or heuristic method. Additionally, some operations may be executed in a different order or may be omitted. Or, other operations may be added.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. An electronic device comprising:
an application processor (AP) configured to control a plurality of functions;
a communication processor (CP) electronically connected to the AP and configured to receive a paging information from a base station according to a discontinuous reception (DRX) operating period; and
a sensor module or a communication module electronically connected to the CP,
wherein when the AP enters a sleep state, the CP is configured to:
control at least one function among the plurality of functions which have been controlled by the AP in a non-sleep state based on information collected from the sensor module or the communication module according to the DRX operating period,
request data collection from the sensor module or the communication module in a first DRX period,
collect the requested data in a second DRX period
determine, in a third DRX period, a state of the electronic device based on the information collected from the sensor or the communication module, and
determine, in a fourth DRX period, an operation to be performed.

2. The electronic device of claim 1, wherein when entering the sleep state, the AP is further configured to assign a control right for the at least one function to the CP.

3. The electronic device of claim 1, wherein the CP is further configured to request a control right for the at least one function from the AP under a specified condition, and
wherein the AP is further configured to assign the requested control right to the CP and enters the sleep state.

4. The electronic device of claim 1, wherein the CP is further configured to turn off at least one function among the plurality of functions in the fourth DRX period or to activate the AP.

5. The electronic device of claim 1, wherein the CP is further configured to control at least some functions among the plurality of functions when a specific interrupt occurs.

6. The electronic device of claim 1, wherein the CP is further configured not to provide a notification through a display, when the information indicates that the display of the electronic device is disposed facing downward on a surface.

7. The electronic device of claim 1, wherein the CP is further configured not to provide a notification through a display when a pre-defined condition is satisfied based on information collected from at least one of an illumination sensor and a proximity sensor of the electronic device.

8. The electronic device of claim 1, wherein the CP is further configured to search for an external device connectable to the CP, when the information collected from the sensor module or the communication module indicates that the electronic device is disposed within a specific range.

9. The electronic device of claim 1, wherein the CP is further configured to increase an information collection period for an arbitrary sensor.

10. The electronic device of claim 9, wherein the CP is further configured to stop collecting information associated with the arbitrary sensor and to de-activate the arbitrary sensor, when the information collection period is increased more than a threshold value.

11. The electronic device of claim 1, wherein the CP is further configured to store data in a memory embedded in the CP and to permit the AP to process the data when the sleep state is released.

12. The electronic device of claim 1, wherein when a specific notification message is received while the AP is in the sleep state, the CP is further configured to provide the notification message by activating the AP.

13. The electronic device of claim 12, wherein the CP is further configured to transmit the notification message and a request message for allowing the AP to perform a specific operation together.

14. An electronic device comprising:
an application processor (AP); and
a communication processor (CP) connected to the AP and configured to search for an available radio resource according to a discontinuous reception (DRX) operating period, and to skip the available radio resource in at least one DRX operating period when a specified condition is satisfied,
wherein the CP searches for the available radio resource by performing at least one of searching for a signal for at least one frequency band, measuring an intensity of the signal, and searching for public land mobile network (PLMN) based on the signal,
wherein the CP is further configured to increase an information collection period for an arbitrary sensor, and
wherein the CP is further configured to stop collecting information associated with the arbitrary sensor and to de-activate the arbitrary sensor, when the information collection period is increased more than a threshold value.

15. The electronic device of claim 14, further comprising a sensor module or a communication module connected to the CP,
wherein the CP determines whether to omit the search in the at least one DRX operating period based on information collected from the sensor module or the communication module in a first period in the DRX operating period.

16. The electronic device of claim 15, wherein when it is determined that the electronic device is in a stop state, the CP is further configured not to search for the available radio resource in the at least one DRX operating period when it is determined that the electronic device is in a stop state.

17. The electronic device of claim 14, wherein the CP is one configured to resume the search for the available radio resource, when a predetermined time elapses after the search for the available radio resource is last performed or it is determined that the electronic device is not in a stop state.

* * * * *